(No Model.)
W. STANLEY, Jr. & J. F. KELLY.
ALTERNATING CURRENT MOTOR.
No. 479,676.  Patented July 26, 1892.
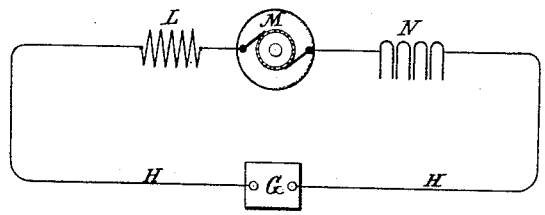
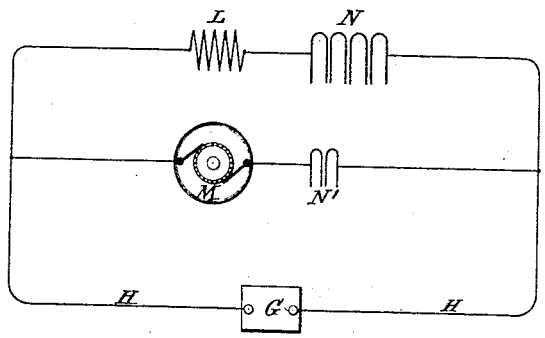
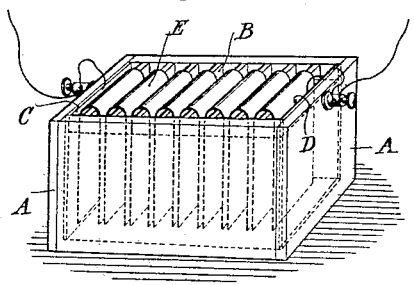
Witnesses:
Raphaël Netter
James Catlow
Inventors
William Stanley, Jr
and John F. Kelly
by Duncan & Page
Attorneys

UNITED STATES PATENT OFFICE.

WILLIAM STANLEY, JR., AND JOHN F. KELLY, OF PITTSFIELD, MASSACHUSETTS.

ALTERNATING-CURRENT MOTOR.

SPECIFICATION forming part of Letters Patent No. 479,676, dated July 26, 1892.

Application filed March 5, 1892. Serial No. 423,822. (No model.)

*To all whom it may concern:*

Be it known that we, WILLIAM STANLEY, Jr., and JOHN F. KELLY, citizens of the United States, residing at Pittsfield, in the county of Berkshire and State of Massachusetts, have invented certain new and useful Improvements in Alternating-Current Motors, of which the following is a specification, reference being had to the drawings accompanying and forming a part of the same.

Primarily our invention consists in the combination, with an alternating-current motor, of a series of conducting-plates arranged in couples and immersed in an electrolyte by which they are not chemically attacked, and included in the circuit of the field magnet or armature, or both, the number and size of the plates being adjusted with reference to the current which is passed through them, so as to serve as a polarizing-cell, which, without decomposition of the electrolyte, will overcome or neutralize the electro-motive force of the self-induction in the circuit in which it is included. The invention, however, is not only applicable in various ways and for various specific purposes to alternating-current motors, according to the character of the said motors, but it is also applicable to alternating-current circuits or systems in which self-induction is present and by the neutralization of which useful results are or may be secured. In our present application we shall describe the invention as applied to motors provided with commutators and in which the alternating current is passed through both the armature and field circuits. Such motors for purposes of this case may be regarded as of two kinds—those in which the field and armature circuits are in series and those in which these circuits are in derivation. In the case of series motors the purpose of the invention is to neutralize the retardation of self-induction, so as to render available the whole of the electro-motive force applied to the operation of the motor, for it is well understood that when a portion of the potential or electro-motive force is taken up in storing energy which on the fall of the applied electro-motive force gives back into the generator this work, while not resulting in an actual loss of power, is wasted so far as its useful effect on the motor is concerned. The fact, moreover, that the current phase under such circumstances does not coincide with the impressed electro-motive force involves a commercial loss for the reason that a greater current value for a given work is required, and this necessitates the construction and use of a plant of greater capacity than would otherwise be required. In such cases, therefore, we insert in the circuit in series with the motor or motors a polarization-cell which will have an electro-motive force equal in value to that of the self-induction. When the field of a motor is in derivation to the main or armature circuit, the retardation therein, owing to the greater self-induction, causes a difference in phase between the currents in the two motor-circuits, which is attended with a similar waste. Hence in this case we connect up a polarization-cell in the field-circuit sufficient to neutralize the electro-motive force of its self-induction, and a smaller cell may also be included in the armature-circuit for the same purpose, if so desired. It is well known that if two conducting-plates be immersed in an electrolyte by which they are not chemically attacked and a current passed from one to the other through the electrolyte an electro-motive force due to polarization is set up, which is manifested on the fall of the potential which produced it. This electro-motive force is in proportion to the current, other things being equal, and any desired effect may be secured by a proper proportioning of the size of the plates and the number connected in series.

In applying our invention in any given case we first ascertain the maximum electro-motive force of self-induction and then construct the polarization-cell so that its electro-motive force will be of the same value for the same current. These results are attained in accordance with well-known laws. It will be observed that the maximum electro-motive force which the polarization-cell should ever be called upon to yield should have a value safely below that which would produce the breaking down of the electrolyte, or, in other words, the point at which electrolysis begins. Furthermore, since the resistance of the cell is not a function, but a mere incident, it should be reduced as far as possible in order to increase the efficiency of the system.

The theoretical operation of the invention applied in the manner above stated is as follows: In an alternating-current circuit possessing self-induction and containing a polarization-cell the electro-motive force of self-induction is ninety degrees behind the current, while that of polarization is ninety degrees ahead of the current, so that the two counter electro-motive forces, being at one hundred and eighty degrees from one another, neutralize and the whole current is rendered available. Under proper conditions the current corresponds with the impressed electro-motive force and the circuit follows, practically, Ohm's law, since there is no other opposition to the current except that of inert resistance.

In the accompanying drawings we show by diagrams the manner of applying and using the invention.

Figure 1 is a diagram of a series motor to which the invention is applied. Fig. 2 is a similar diagram of a shunt-wound motor, and Fig. 3 is a perspective view of the polarization-cell.

The latter may be made in many ways; but we prefer to construct a cell or box A with a number of insulated compartments formed by partitions B. In the end compartments are plates C D, connected with the terminals, and other plates E, bent upon themselves, are hung or supported over the partitions B. The plates may be of carbon in acidulated water, or of sheet-iron in a solution of caustic potash, or of other proper materials, and are disposed, as shown, in series.

In Fig. 1, let G designate a generator of alternating currents, and H a circuit containing the working devices and possessing self-induction. In this figure the working device is represented as a series motor, of which L designates the field and M the armature. If in such a circuit a polarization-cell N be introduced, it will, if properly adjusted or proportioned with reference to the conditions of the circuit or current to be employed, in accordance with the considerations advanced above, so neutralize the effects of the self-induction as to allow the entire electro-motive force of the generator to be availed of in driving the motor. So in Fig. 2, where the field L and armature M are in derivation, the effects of self-induction in both motor-circuits may be neutralized by properly-proportioned polarization-cells N N', placed in the two circuits, respectively.

We do not wish to be understood as claiming the discovery that the electro-motive force of self-induction is opposed by that of polarization; but our invention resides in the adaptation of this principle to a useful and practicable purpose and in the utilization and application, in the manner herein set forth, of a device which combines enormous capacity in small compass and by means of which results are or may be secured that would not be practicable or perhaps possible by the use of other devices — such as condensers — which have heretofore been proposed.

What we claim is—

1. The combination, with an electric circuit possessing self-induction, of a source of alternating currents and conducting-plates arranged in couples in an electrolyte and connected in series with the circuit and adapted by adjustment to the electrical conditions of the circuit to neutralize by polarization the electro-motive force of the self-induction in the circuit, as set forth.

2. The combination, with an alternating-current motor and in series with the circuit or circuits of the same, of a polarization-cell adapted to yield an electro-motive force opposite to that of the self-induction of the motor, as set forth.

3. The combination, with an alternating-current motor and in series with the same, of a series of couples of conducting-plates immersed in an electrolyte which does not chemically attack said plates and adapted or proportioned to act as a polarization-cell for neutralizing the electro-motive force of the self-induction of the motor.

WILLIAM STANLEY, JR.
JOHN F. KELLY.

Witnesses:
WILSON D. CARPENTER,
HENRY J. RYAN.